United States Patent [19]

Williams

[11] 4,088,302
[45] May 9, 1978

[54] SEAL MEMBER FOR FAUCET VALVE
[75] Inventor: Frank N. Williams, Aurora, Ill.
[73] Assignee: Bradley Corporation, Menomonee Falls, Wis.
[21] Appl. No.: 732,023
[22] Filed: Oct. 13, 1976
[51] Int. Cl.² .............................................. F16K 27/00
[52] U.S. Cl. .................................... 251/361; 251/368; 251/172; 277/205; 277/207 R
[58] Field of Search ................ 277/207, 205; 251/361, 251/368, 172, 174, 175

[56] References Cited
U.S. PATENT DOCUMENTS

| 2,204,586 | 6/1940 | Grau | 277/205 X |
| 2,421,659 | 6/1947 | Sutton | 277/207 |
| 2,912,218 | 11/1959 | Stillwagon | 251/361 X |
| 3,175,833 | 3/1969 | Morse | 277/205 |
| 3,236,496 | 2/1966 | Rosenstein | 251/368 X |
| 3,543,799 | 12/1970 | Hayman | 251/174 X |
| 3,913,612 | 10/1975 | Toluai | 251/172 X |

Primary Examiner—Harold W. Weakley
Attorney, Agent, or Firm—Thad F. Kryshak

[57] ABSTRACT

A seal member for a noncompression-type faucet valve comprises a cylindrical member having an open top and an open bottom, both of which are partially closed by inwardly directing flanges. The member is further provided intermediate its length with an external outwardly directed circumferential ridge. The seal member is intended for use in a faucet valve which has a rotatable valve stem having an inlet passage offset from the axis of rotation positioned within the bore of a valve housing that has an inlet port which is offset from the axis of the bore. Flow through an outlet tube leading from the bore is controlled by rotating the stem to move the inlet passage into and out of registry with the inlet port in the bore.

The seal member is comprised of a resilient material such as butane rubber and it is friction fit into a seal-receiving recess about the inlet port in the bottom of the valve housing. Once the seal member is in place, it is immovable in the recess and a liquid-tight seal is formed between the side wall of the recess and the ridge. Additional liquid-tight seals are formed between the bottom flange and the bottom of the seal-receiving recess and the top flange and the bottom of the valve stem. The latter seals are reinforced by supply line pressure exerted on the inner surface of the flanges.

3 Claims, 7 Drawing Figures

SEAL MEMBER FOR FAUCET VALVE

BACKGROUND OF THE INVENTION

Compression-type faucets have been used for many years to control the flow of water through domestic hot and cold water lines. Although the compression-type faucets are widely used, they possess several distinct disadvantages. For example, they are inherently subject to wear and seal deformation and in addition, are noisy in operation. As a result, in recent years numerous efforts have been made to develop replacement valves for the compression-type faucets.

One type of faucet valve proposed for replacement of compression-type faucet valves for the control of domestic hot and cold water lines is that disclosed in the Williams U.S. Pat. No. 3,009,679 and the variation thereof shown in the Manoogian et al., U.S. Pat. No. 3,645,493. The faucet valves disclosed in both of the patents comprise valve housings with upwardly open bores which have an inlet port which is offset from the axis of the bore and an outlet tube which leads from the bore to a spout. Positioned within the bore is a rotatable valve stem member which has an inlet passage in its bottom which is offset from the axis of rotation. Flow through the valves is controlled by rotating the valve stem to bring the inlet passage into and out of registry with the inlet port. In order to prevent flow from occurring when the inlet port and the inlet passage of the stem are out of registry, the inlet port is surrounded by a seal-receiving recess in which a seal member is positioned which forms a liquid tight seal with a solid portion of the bottom of the stem.

The wear of the seal member in this type of faucet valve is minimal because the seal member is not compressed by the stem and the bottom surface of the stem merely rotates over the seal member which is urged into a sealing engagement with the bottom of the stem by a compression spring. Although the described faucet valves are commercially available and gaining wide acceptance, they are not completely without disadvantage. For example, on occasion in some valves especially after substantial use, the seal between the side wall of the movable seal member and the recess may fail and water will seep between the wall of the recess and the outer wall of the seal member and enter the bore and pass through the outlet tube causing the faucet to drip. When this occurs, the seal member must be replaced which is not an easy task because of the need to also properly reset the spring.

SUMMARY OF THE INVENTION

It is an object of the present invention to disclose a noncompression-type faucet of the type shown in the Williams and Manoogian et al., patents in which an improved seal member eliminates faucet drippings.

It is a further object of the present invention to provide a noncompression-type faucet with an improved seal member which eliminates the need for the use of the compression spring presently employed in such faucets.

It is a further object of the present invention to provide a novel inexpensive seal member for use in the described noncompression-type faucets which seal member can be readily replaced by even the inexperienced home handyman.

The seal member of the present invention is preferably molded of a resilient material and comprises a cylindrical shaped hollow body having a rounded open top and a rounded open bottom, both of which are partially closed by inwardly directed flanges. The body is further provided with an outwardly projecting circumferential ridge located intermediate the length of said body. The circumferential ridge is slightly larger in diameter than the internal diameter of a seal member receiving recess which is located about the inlet port so that when the seal member is friction fit into the recess, the seal member is immovable and the ridge-like member forms a liquid-tight seal between the wall of the recess and the main body of the seal member. The compression of the ridge also forces the body of the seal member inwardly so that the flanges of the open top and the bottom are flared outwardly.

The length of the seal member is preferably sized so that when it is friction fit in the seal-receiving recess, the flared flanges form seals with the bottom of the recess and the bottom of the valve stem. The thus formed seals are strengthened and maintained by water pressure exerted on the interior surfaces of the flanges.

Another distinct advantage of the unique seal member of the present invention is that since it does not move within the recess once it is in position as does the prior art spring actuated seal members, it is much longer wearing and trouble free. A still further advantage is that it can be easily replaced by simply removing the old seal member and pressing a new one into place.

These and still other advantages will be apparent from the description which follows.

DESCRIPTION OF THE PREFERRED EMBODIMENT

Figure 1:
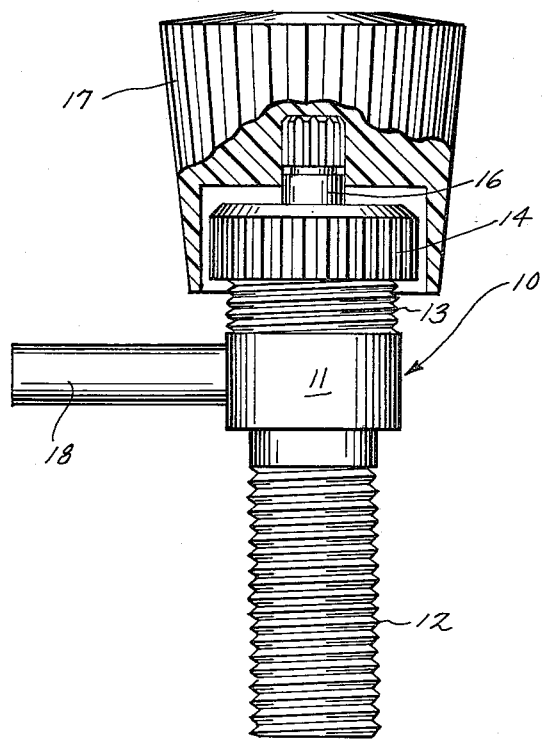
FIG. 1 is a side view partially in section of a faucet valve equipped with the improved seal member of the present invention.
Figure 2:
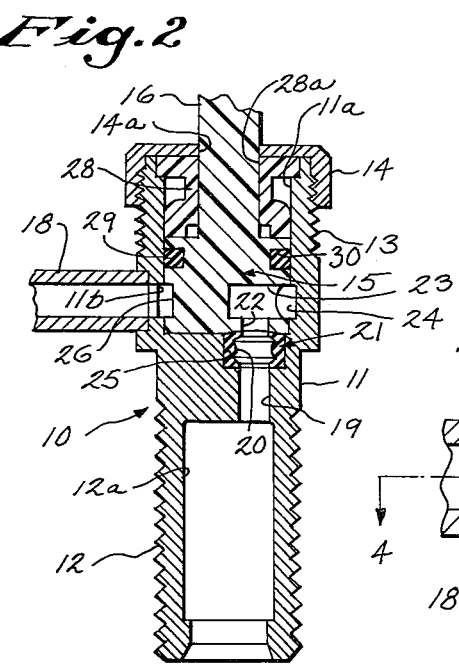
FIG. 2 is a side view partly in section showing the faucet valve of FIG. 1 with the handle removed and the alignment of the internal components when the valve is in the open position.

Referring now to the drawings in which the faucet valve is generally referred to by the number 10, it can be seen in FIGS. 1 and 2 that the faucet valve includes a hollow valve body 11 which has a lower externally threaded portion 12 which is adapted to be connected in a conventional manner to either a hot or cold water line (not shown) and an upper externally threaded portion 13 which is closed by a retaining cap 14. Positioned within the hollow interior 11a of the valve body 11 is a rotatable valve stem 15 (seen only in FIG. 2). The shaft 16 of the stem 15 extends through an opening 14a in the retaining cap 14 and is fitted with a handle 17 to facilitate the rotation of the stem. Extending laterally from the main portion of the valve body 11 is an outlet tube 18 which leads to a faucet spout (not shown).

Figure 3:
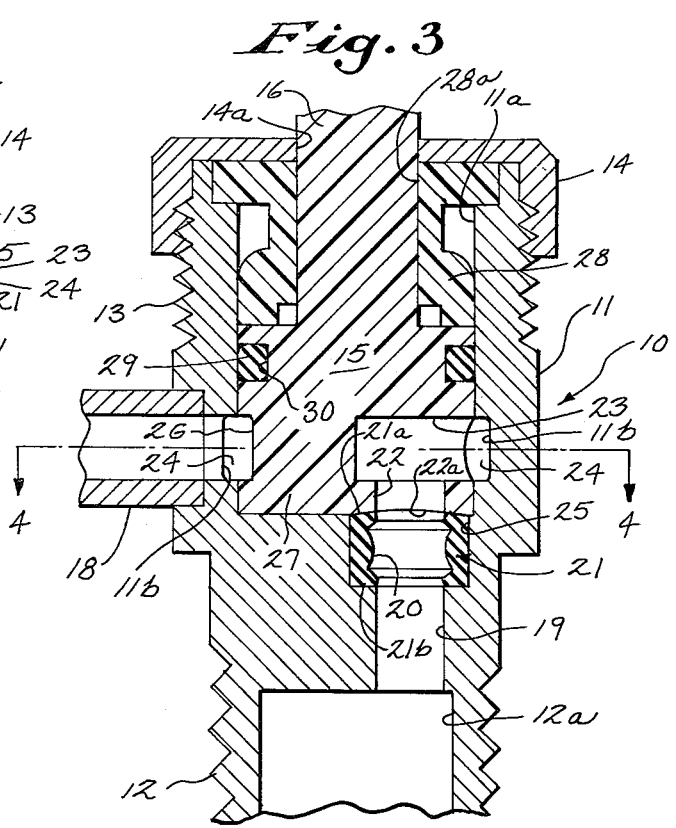
FIG. 3 is an enlarged sectional view of the lower portion of the faucet including the seal-receiving recess with the seal member in position.

Turning now to FIGS. 2 and 3, which are vertical sectional views of the faucet valve 10 of FIG. 1 without the handle in place, it can be seen that when the valve is in the open position, water from the supply line enters the valve body 11 through the bore 12a of the lower threaded section 12 and flows through an inlet port 19, through a bore 20 of a seal member 21, an inlet passage 22, and an enlarged horizontal passage 23 in the stem 15, and via a passageway 24 about the stem 15 to the outlet tube 18 and the spout (not shown).

In FIGS. 2 and 3, it can be seen that the inlet port 19 is offset from the axis of the bore 11a. It can also be seen that the entrance of the inlet port 19 into the bore 11a is enlarged to provide a seal member receiving recess 25 in which the hollow resilient seal member 21 is friction fit. The inlet passage 22 in the stem 15 is offset from the axis of rotation of the stem 15 and thus can be moved into and out of registry with the inlet port 19.

Figure 4:
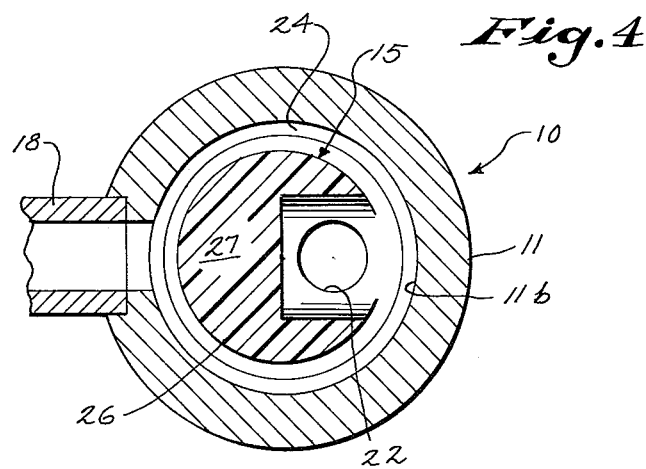
FIG. 4 is a sectional view of the valve taken along lines 4—4 of FIG. 3.

Turning now to FIG. 4, it can be seen that the inlet passage 22 in the stem 15 communicates with an enlarged horizontally extending passage 23 which in turn communicates with the passageway 24 which is, as seen in FIGS. 2 and 3, comprised of a circumferential groove 26 in the stem and an internal groove 11b in the bore 11a of the valve body 11.

Returning to FIG. 4, it can be seen that the passageway 24 extends completely about the stem 15 to the outlet 18. It can also be seen in FIG. 4 that the inlet passageway 22 and the enlarged passage 23 are both located on the same half of the stem 15 and the remaining half is solid. Thus, the stem 15 may be rotated so that the solid half 27 of the stem 15 is positioned over the inlet port 19 to stop flow through the valve. It is also apparent from FIG. 4 that the valve stem 15 can be rotated so that the inlet passage 22 is only partially in registry with the inlet port 19. When that occurs, flow throgh the valve is reduced but not stopped completely.

Returning to FIGS. 2 and 3, it can be seen that the stem 15 is retained in proper position for rotation by a retaining collar 28 which has a central opening 28a through which the shaft 16 of the stem 15 extends. Water is prevented from flowing out of the valve body by passing along the shaft 16 of the stem and through the opening 14a in the retaining cap 14 by a sealing O-ring 29 which is positioned in an O-ring receiving recess 30 which is located above the working area of the valve.

In the preferred embodiment of the invention as seen in FIG. 3, the entrance of the inlet passage 22 in the bottom of the stem 15 is located on a radius so that a concave area 22a surrounds the entrance. The gentle slope of the concave area allows the stem 15 to be rotated over the seal member 21 with a minimum of wear.

Figures 5, 6:
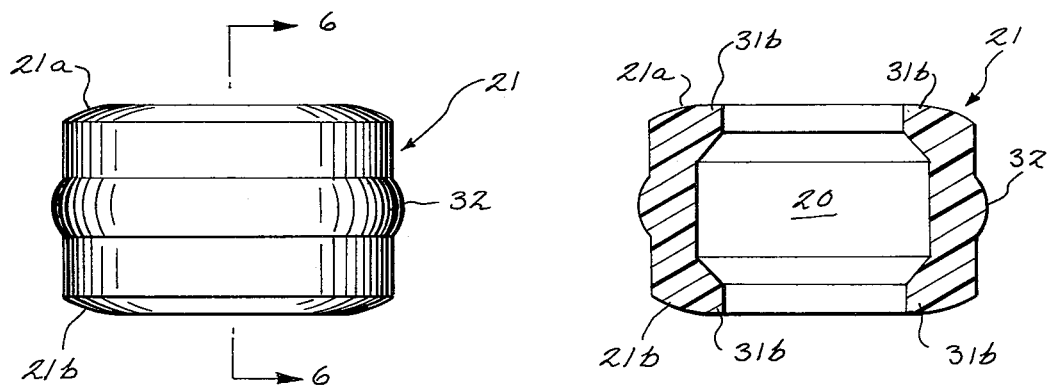
FIG. 5 is a side elevational view of the seal member.
FIG. 6 is a sectional view of the seal member taken along lines 6—6 of FIG. 5.
Figure 7:
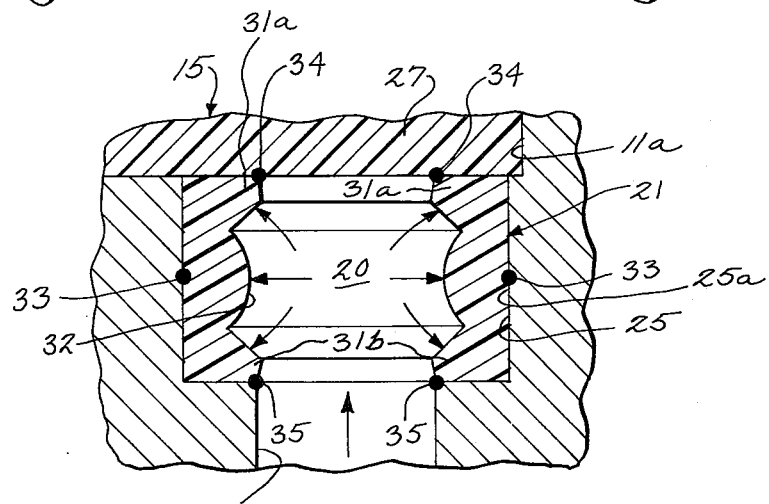
FIG. 7 is an enlarged view of the seal in position in the seal-receiving recess which view shows by arrows the direction of supply line pressure exerted upon the inner surfaces of the seal member when the valve is in the closed position.

Turning now to FIGS. 5, 6 and 7, it can be seen that the seal member 21 is a generally cylindrical body which has a bore 20 which is partially closed at the rounded top 21a and the rounded bottom 21b by inwardly directed flanges 31. It can further be seen in FIGS. 5 and 6, that the outer wall of the seal member 21 is provided with an intermediate outwardly extending circumferential ridge 32. As seen in FIG. 6, the flanges 31 join the side wall of the seal 21 at an angle of approximately 45° from the horizontal.

Referring now specifically to FIG. 7, it can be seen that when the valve is closed, a plurality of seals exist which prevent the valve from dripping. The first liquid-tight seal 33 is between the side wall 25a of the recess 25 and the ridge 32 of the seal. It is formed and maintained by the compression of the ridge 32 as a result of the seal being friction fit in the recess. The seal 33 prevents the water from seeping past the seal member 21 into the bore 11a. The effectiveness of the seal 33 is enhanced by supply line pressure upon the interior wall of the seal member 21. The direction of the forces exerted by supply line pressure are shown in FIG. 7 by arrows. As a result of the compression of the ridge 32 and supply line pressure upon the interior surfaces of the seal 21 and especially the angled inner surface of the flanges 31, the flanges 31 are flared outwardly. The top flange 31a forms a liquid-tight seal 34 with the solid portion 27 of the bottom of the stem 15 and the bottom flange 31b forms a liquid-tight seal 35 with the bottom of the seal-receiving recess 25. The seal 35 assists the seal 33 in preventing water from seeping between the outside wall of the seal member 21 and the wall 25a of the recess 25 and into the bore 11a when the valve is in the closed position and the seal 34 prevents any water from the inlet port 19 from entering the bore 11a at junction of the seal member 21 and bottom of the stem 15.

The seals 33 and 35 provided by the seal member 21 of the present invention are unique and were previously unavailable with the spring activated seal members of the prior art. The spring activated seal members had to be free to move within the recess and thus could not be sized to form tight seals especially with the side wall and bottom wall of the recess.

In the preferred practice of the invention, the seal member 21 is preferably formed of butane rubber or a similar resilient material and has a durometer of about 95. In addition, the seal member 21 is sized so that the rounded bottom 21b of the seal member 21 rests upon the bottom of the seal member receiving recess 25 and the rounded top 21a protrudes slightly above the side wall 25a of the recess. Although the main body of the seal member 21 is preferably of the same external diameter as the seal member receiving recess 25, in order to insure a tight friction fit, the circumferential ridge 32 is larger in diameter than the recess 25 so that when the seal member is in place the ridge will compress as shown in FIG. 7.

From the foregoing it will be readily apparent to those skilled in the art that the seal member of the present invention is not only novel and useful but that it is unobvious in that it provides a simple solution to the problems which existed with the described type of non-compression faucet valve while at the same time eliminating the compression spring previously felt to be an essential component of such faucets.

While in the foregoing description a preferred embodiment has been set forth for purposes of explanation and illustration, it is to be understood that a wide variety of variations and changes may be made without departing from the spirit and scope of the invention. For example, the bottom flange of the seal member could be dispensed with if for some reason the bottom seal was not desired or considered necessary. In addition, if a stronger seal between the side wall of the recess and the outer wall of the seal member was desired, it may be advantageous in some instances to have two or more circumferential ridges in place of the one shown in the preferred embodiment. In view of these and other possible modifications, it is not intended that the invention be limited by the showing herein, or in any other manner, except insofar as is specifically required.

I claim:

1. in a noncompression-type faucet valve of the type which includes a valve housing with an internal bore and an inlet port in the bottom of the bore which is offset from the axis of said bore; a rotatable valve stem having an inlet passage in the bottom of the stem which can be moved into and out of registry with said inlet port; a seal member receiving recess about the inlet port and a seal member which forms a tight seal with the bottom of said stem, the improved seal member which comprises a resilient cylindrical hollow body having an open top and an open bottom-both of which are partially closed by inwardly directed tapered flanges, said member being further provided with an external intermediate outwardly extending circumferential ridge, which ridge is larger in diameter than the inner diameter of the recess so that once the member is in place the ridge is compressed to render the seal member immovable and to form a liquid-tight seal between the member and the side wall of the seal and to cause the flanges to flare outwardly to form liquid-tight seals with the bottom of the recess and the bottom of the stem.

2. The seal member of claim 1 which is composed of butane rubber.

3. The seal member of claim 1 which is made of a material having a durometer of about 95.

* * * * *